(12) United States Patent
Shu et al.

(10) Patent No.: US 8,914,869 B2
(45) Date of Patent: Dec. 16, 2014

(54) GATEWAY SYSTEM AND METHOD FOR IMPLEMENTING ACCESS TO VARIOUS MEDIA

(75) Inventors: Guiming Shu, Shenzhen (CN); Hui Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 841 days.

(21) Appl. No.: 12/342,505

(22) Filed: Dec. 23, 2008

(65) Prior Publication Data

US 2009/0113539 A1 Apr. 30, 2009

Related U.S. Application Data

(63) Continuation of application No. PCT/CN2007/qj070237, filed on Jul. 4, 2007.

(30) Foreign Application Priority Data

Jul. 5, 2006 (CN) .......................... 2006 1 0091170

(51) Int. Cl.
*G06F 21/00* (2013.01)
*H04L 29/06* (2006.01)
(Continued)

(52) U.S. Cl.
CPC ...... *H04L 29/06027* (2013.01); *H04L 12/2821* (2013.01); *H04L 12/2836* (2013.01);
(Continued)

(58) Field of Classification Search
CPC ..... H04W 12/06; H04W 36/14; H04W 36/16; H04W 36/005; H04W 88/005; H04L 12/2821; H04L 12/2836; H04L 12/2838; H04L 65/1043; H04L 29/06027

USPC ........................................ 726/12, 6; 380/247
See application file for complete search history.

(56) References Cited

U.S. PATENT DOCUMENTS 5,586,260 A * 12/1996 Hu .................................. 726/12
6,092,196 A * 7/2000 Reiche .............................. 726/6
(Continued)

FOREIGN PATENT DOCUMENTS

| CN | 1432258 A | 7/2003 |
|---|---|---|
| CN | 1604555 A | 4/2005 |

(Continued)

OTHER PUBLICATIONS

State Intellectual Property Office of the People's Republic of China, Examination Report in Chinese Patent Application No. 200610091170.0 (Apr. 13, 2010).
(Continued)

*Primary Examiner* — Kambiz Zand
*Assistant Examiner* — Don Zhao
(74) *Attorney, Agent, or Firm* — Leydig, Voit & Mayer, Ltd.

(57) ABSTRACT

A gateway system for implementing access to various media is provided in the invention, and the gateway system includes: a communication media access module, for establishing a communication link with the corresponding media access network; a Media Independent Handover Functions module, for seamless handover between accesses to various media; and a handover decision module, for selecting a target network for the seamless handover. The gateway system may also include an authentication module, for sharing the authentication information of the User Equipment. Two methods for implementing access to various media are further disclosed in the invention. By the provided gateway system and methods, the User Equipment can access various media via the gateway system, seamlessly hand over between accesses to various media and achieve the access to a service network using the shared authentication information.

15 Claims, 5 Drawing Sheets

(51) Int. Cl.
*H04L 12/28* (2006.01)
*H04W 12/06* (2009.01)
*H04W 36/00* (2009.01)
*H04W 88/00* (2009.01)

(52) U.S. Cl.
CPC .......... *H04L 12/2838* (2013.01); *H04W 12/06* (2013.01); *H04W 36/005* (2013.01); *H04L 65/1043* (2013.01); *H04W 88/005* (2013.01)
USPC ................................................ 726/12; 726/6

(56) References Cited

U.S. PATENT DOCUMENTS

| | | | | |
|---|---|---|---|---|
| 6,606,663 | B1* | 8/2003 | Liao et al. ...................... | 709/229 |
| 7,194,761 | B1* | 3/2007 | Champagne ...................... | 726/6 |
| 2002/0046170 | A1* | 4/2002 | Gvily ............................. | 705/42 |
| 2003/0194987 | A1* | 10/2003 | Pattabiraman et al. ........ | 455/403 |
| 2003/0195010 | A1* | 10/2003 | Pattabiraman et al. ........ | 455/517 |
| 2004/0029587 | A1 | 2/2004 | Hulkkonen et al. | |
| 2004/0181663 | A1 | 9/2004 | Pienimaki et al. | |
| 2004/0250085 | A1* | 12/2004 | Tattan et al. ................. | 713/186 |
| 2005/0013264 | A1* | 1/2005 | Sundberg ....................... | 370/328 |
| 2005/0081044 | A1* | 4/2005 | Giles et al. ................... | 713/182 |
| 2005/0165953 | A1 | 7/2005 | Oba et al. | |
| 2006/0059341 | A1* | 3/2006 | Dharmadhikari et al. .... | 713/168 |
| 2006/0140150 | A1* | 6/2006 | Olvera-Hernandez et al. ........................... | 370/331 |
| 2006/0276192 | A1* | 12/2006 | Dutta et al. ................... | 455/436 |
| 2007/0047491 | A1* | 3/2007 | Dutta et al. ................... | 370/331 |
| 2007/0109989 | A1* | 5/2007 | Nakagawa et al. ........... | 370/328 |
| 2008/0162924 | A1* | 7/2008 | Chinitz et al. ................. | 713/153 |

FOREIGN PATENT DOCUMENTS

| | | |
|---|---|---|
| CN | 1750497 A | 3/2006 |
| CN | 1794676 A | 6/2006 |
| CN | 1432258 A | 7/2006 |
| CN | 101102189 B | 6/2011 |
| WO | WO 2005/072276 A2 | 8/2005 |

OTHER PUBLICATIONS

State Intellectual Property Office of the People's Republic of China, English Translation of Written Opinion of the International Searching Authority in International Patent Application No. PCT/CN2007/070237 (Oct. 18, 2007).

IEEE, "Draft IEEE Standard for Local and Metropolitan Area Networks: Media Independent Handover Services," Sponsored by LAN/MAN Standards Committee of the IEEE Computer Society, IEEE P802.21™ /D01.00 (Mar. 2006).

International Search Report in corresponding PCT Application No. PCT/CN2007/070237 (Oct. 18, 2007).

* cited by examiner

GATEWAY SYSTEM AND METHOD FOR IMPLEMENTING ACCESS TO VARIOUS MEDIA

CROSS-REFERENCE TO RELATED APPLICATIONS

This application is a continuation of International Patent Application No. PCT/CN2007/070237, filed Jul. 4, 2007, which claims priority to Chinese Patent Application No. 200610091170.0, filed Jul. 5, 2006, both of which are hereby incorporated by reference in their entirety.

FIELD OF THE INVENTION

The present invention relates to communication technologies, and, particularly, to a gateway system and method for implementing access to various media.

BACKGROUND OF THE INVENTION

With the development of communication technologies and networks, there exist generally various communication networks in one region, and a multi-mode terminal equipment supporting communication with various communication networks is developed to meet user requirements. The various communication networks have different network service regions, and service capabilities of the various communication networks are different, thus, users desire that the multi-mode terminal equipment is capable of media independent seamless handover between different communication media networks, thereby ensuring service continuity. The 802.21 protocol is proposed for the above user requirements, and defines architecture of implementing the Media Independent Handover Functions (MIHF) for the multi-mode terminal equipment. In the architecture, a media independent handover layer is added between layer 2 and layer 3 in the protocol stack of a network entity, and at the media independent handover layer, interfaces to the upper and lower layers of the protocol stack, the Station Management Entity (SME) and the media independent handover layer of a peer communication entity are defined, so that event, command and information services are provided for the multi-mode terminal equipment to implement the media independent seamless handover.

Currently, many network terminal equipments may access different service networks via a gateway device, the access function of which enables a connection between a Local Area Network and a public network. Generally, the gateway may implement the uplink access to the public network in various manners, such as the Asymmetric Digital Subscriber Line (ADSL), the Ethernet, the CATV cables, and the power lines. The management functions of the gateway include address resolution, data packet forwarding, Quality of Service (QoS) control, Dynamic Host Configuration Protocol (DHCP), a firewall function, and the like.

As the pace of social work and living gets faster and faster and more and more vehicles emerge, more time is spent on the vehicles. In addition, people depend more and more on the network for business and personal requirements. Therefore, it is necessary to provide a relatively stable network environment on the moving vehicle for users, to enable the users on the moving vehicle to utilize various terminal equipments, and access the desired service networks via access approaches, based on various communication media to obtain the desired services. At present, although many home gateway devices are capable of enabling home network terminal equipments to access various access networks and service networks, the network environment of the existing home LANs is a fixed LAN environment, and the network terminal equipments in the home LANs are typically connected fixedly to the respective communication networks. Therefore, the existing home gateway devices fail to properly implement the media independent seamless handover of the network terminal equipments in the mobile environment between the various communication media networks, thus, service continuity is not ensured. Further, the existing home gateway devices fail to enable all User Equipments (UEs), which are connected to the gateway device but not authenticated, to access the service networks. As a result, the existing home gateway device cannot properly support the access to various media in the mobile environment.

SUMMARY OF THE INVENTION

Embodiments of the present invention provide a gateway system and method for implementing access to various media, to support the access to various media in mobile environment.

The embodiments of the present invention provide the following solutions for the above objects.

A gateway system for implementing access to various media is provided, and the gateway system includes: a communication media access module, adapted to provide an authentication module or a User Equipment supporting sharing of authentication information with a communication link to the current access network; and the authentication module, adapted to obtain and store the authentication information from at least one User Equipment supporting sharing of authentication information, query for and select the authentication information satisfying service requirements of a second User Equipment from the stored authentication information, according to an access request sent by the second User Equipment; and implement the access from the second User Equipment to the service network via the communication media access module, according to the selected authentication information; alternatively, the authentication module may forward the access request to the first User Equipment supporting sharing of authentication information, which corresponds to the selected authentication information, and the access from the second User Equipment to the service network is implemented by the first User Equipment via the communication media access module.

An embodiment of the present invention also provides a method for implementing access to various media, and the method includes: A. establishing, by a gateway system, a communication link to the current access network, and implementing the access from a User Equipment supporting sharing of authentication information to a service network; B. obtaining and storing, by the gateway system, authentication information used for the access from at least one User Equipment supporting sharing of authentication information to the service network, and sharing the stored authentication information; and C. implementing, by the gateway system, the access from a second User Equipment to the service network using the shared authentication information.

Further, an embodiment of the present invention provides a gateway system for implementing access to various media, and the gateway system includes: a communication media access module, adapted to provide a communication link to the current access network for a User Equipment, send a handover request to a Media Independent Handover Functions module, according to the status of the communication link to the current access network, and establish a new communication link to a selected target network, according to information of the selected target network returned by the Media Independent Handover Functions module; the Media Independent Handover Functions module, adapted to send a request for selecting the target network to a handover decision module, according to the received handover request, and send to the communication media access module the information of the selected target network returned by the handover decision module; and the handover decision module, adapted to select the target network, according to the received request for selecting the target network, and return the information of the selected target network to the Media Independent Handover Functions module.

Further, an embodiment of the present invention provides a method for seamless handover in the case of access to various networks, and the method includes: A. establishing, by a gateway system, a communication link to the current access network, so as to transfer services of a User Equipment; B. selecting, by the gateway system, a target network, according to the status of the communication link to the current access network; and C. establishing, by the gateway system, a new communication link to the selected target network.

In the gateway system and method for implementing access to various media according to the embodiments of the present invention, the gateway system includes the communication media access module, the Media Independent Handover Functions module, the handover decision module, and the authentication module, and, therefore, may offer various media access approaches in the mobile environment (such as a moving vehicle or train) and the other application scenarios, and enable seamless handover between the various media access approaches, thereby providing, within the region served by the gateway system, a LAN environment which allows uninterrupted access to the service network. Further, the gateway system enables the User Equipment connected thereto to share the authentication information for the access network and the service network, and to pass the authentication of the access to the corresponding access network or service network with the shared authentication information. In addition, the gateway system may select, for the User Equipment sending a service request, a subscribed user satisfying service capability requirements of the User Equipment from a plurality of subscribed users in the service network subsystem domain, so that the User Equipment may register with the service network subsystem domain, and the registered User Equipment may send the service request to the service network subsystem domain.

DETAILED DESCRIPTION OF THE EMBODIMENTS

The implementation of the present invention is described below in detail in connection with some drawings and embodiments of the invention.

Figure 1:
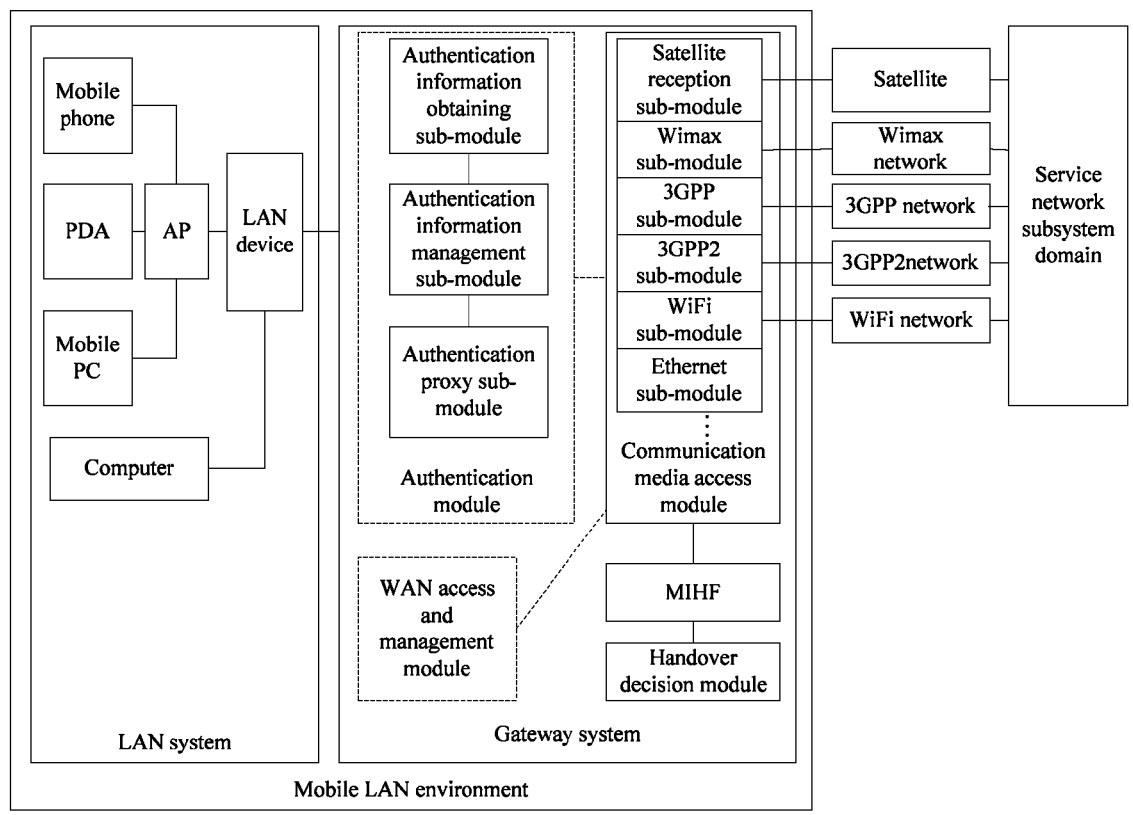
FIG. 1 is a diagram showing a networking structure, according to an embodiment of the present invention.

As shown in FIG. 1, the networking structure according to an embodiment of the present invention includes a mobile LAN environment and a service network subsystem domain. The mobile LAN environment may access the service network subsystem domain by means of networks of various media including a satellite, a Worldwide Interoperability for Microwave Access (WiMAX) network, a Third Generation Partnership Project (3GPP) network, a Third Generation Partnership Project 2 (3GPP2) network, a Wireless Fidelity (WiFi) network, and the Ethernet, and exchange data with the service network subsystem domain through the networks of the above various media.

The mobile LAN environment includes a LAN system and a gateway system. The LAN system includes a LAN device, an Access Point (AP) and various User Equipments (UEs), such as a computer, a mobile phone, a Personal Digital Assistant (PDA), and a mobile Personal Computer (PC). The LAN device is connected to the gateway system, the computer and the AP are connected to the LAN device, and the mobile phone, PDA, and mobile PC are connected to the AP. The UEs in the LAN system may access (including access authentication or registration) the service network subsystem domain, such as the IP Multimedia Subsystem (IMS), through the gateway system. Further, the UEs in the LAN system are divided into UEs with a Universal Integrated Circuit Card/IP Multimedia Services Subscriber Identity Module (UICC/ISIM) card and UEs without UICC/ISIM card. The UE with the UICC/ISIM card may access the service network by using the authentication information stored in the UICC/ISIM card, while the UE without UICC/ISIM card needs to obtain the authentication information from the UICC/ISIM card of the UE with the UICC/ISIM card through the gateway system and access the service network by using the obtained authentication information.

The gateway system includes a handover decision module, a Media Independent Handover Functions module and a communication media access module. The communication media access module is connected to the MIHF module, and the MIHF module is connected to the handover decision module.

The communication media access module includes various media access sub-modules, such as a satellite reception sub-module, a WiMAX sub-module, a 3GPP sub-module, a 3GPP2 sub-module, a WiFi sub-module, and an Ethernet sub-module. The satellite reception sub-module connects to the service network subsystem domain via a satellite network, the WiMAX sub-module connects to the service network subsystem domain via a WiMAX network, the 3GPP sub-module connects to the service network subsystem domain via a 3GPP network, the 3GPP2 sub-module connects to the service network subsystem domain via a 3GPP2 network, and the WiFi sub-module connects to the service network subsystem domain via a WiFi network. The media access sub-modules of the communication media access module are connected to the networks of various media through Points of Attachment (PDAs) in the networks of various media (not shown in FIG. 1). The POAs are APs of the media access sub-modules to the networks of various media. In the WiFi network, for example, the POA or AP is equivalent to a base station in the WiFi network.

Accordingly, the gateway system may access the networks of various media through the sub-modules in the communication media access module, provide a communication link to the current access network for the UE in the mobile LAN environment, so that the UE may access the service network subsystem domain. The communication media access module of the gateway system enables, through cooperation with the MIHF module and the handover decision module, the UE in the LAN environment to accomplish media independent seamless handover, so that uninterrupted access to the service network subsystem domain is achieved.

To perform the media independent seamless handover, a first media access sub-module of the communication media access module that corresponds to the current access network sends a first handover request to the MIHF module, to request for the media independent seamless handover. The MIHF module sends a second handover request to the handover decision module, according to information, such as service capability of the current access network, carried in the received first handover request to request for the media independent seamless handover, and notifies the handover decision module of the status of the current access network. The handover decision module obtains location information of the region where the UE is currently located and information of access network distribution from an information server (not shown in FIG. 1) at the access network side, according to information, such as service capability of the current access network, that is carried in the received second handover request, selects an available access network as the target network for the handover, and returns a handover request response carrying information of the target network to the MIHF module. The MIHF module sends the handover request response to the first media access sub-module corresponding to the current access network, and instructs the first media access sub-module to get ready for the handover. According to the received handover request response, the MIHF module sends a handover instruction to the current access network and a second media access sub-module in the communication media access module corresponding to the target network, to instruct performing the handover. The second access sub-module establishes a communication link to the target network, according to the received handover instruction, and hands over the service of the UE to the newly established communication link with cooperation of the first access sub-module, thereby implementing the media independent seamless handover.

The gateway system further includes an authentication module connected to the communication media access module. The communication media access module sends to the service network the access request sent by the authentication module or the UE supporting sharing of authentication information via the access network corresponding to the access request, and sends the information about unauthorization or authorization returned by the service network, according to the access request to the authentication module or UE supporting sharing of authentication information, thereby implementing the access from the authentication module or UE supporting sharing of authentication information to the service network.

The authentication module may obtain from a plurality of UEs supporting sharing of authentication information that are connected to the mobile LAN environment (such as the computer, mobile phone, PDA, and mobile PC in the LAN system, i.e. UEs with the UICC/ISIM card) the authentication information of the UEs for the service network, stores the authentication information, and shares the authentication information. The other UEs connected to the mobile LAN environment may access the service network via the communication media access module, according the shared authentication information in the authentication module. The access includes access authentication or registration.

The authentication module queries for and selects authentication information satisfying service requirements of a UE B from the stored authentication information, according to an access request "_b_" sent by the UE B, and sends an access request "_a_" to the communication media access module, according the selected authentication information to request for the access to the service network, and sends the information of unauthorization or authorization returned by the communication media access module to the UE B, so that the access from the UE B to the service network is implemented.

Alternatively, the authentication module may forward the access request "_b_" to a UE A supporting sharing of authentication information that corresponds to the selected authentication information, and the UE A sends the access request "_a_" to the communication media access module to request for the access to the service network, and forwards the information about unauthorization or authorization returned by the communication media access module to the UE B, to implement the access from the UE B to the service network.

The authentication module further includes an authentication information obtaining sub-module, an authentication information management sub-module, and an authentication proxy sub-module. The authentication information management sub-module is connected to both the authentication information obtaining sub-module and the authentication proxy sub-module. The authentication information obtaining sub-module obtains the authentication information of the UE for the access network or service network from the UICC/ISIM card of the UE in the LAN system, and sends the obtained authentication information to the authentication information management sub-module. The authentication information management sub-module stores and manages the obtained authentication information sent by the authentication information obtaining sub-module, queries for and selects the stored authentication information, according to a query request from the authentication proxy sub-module, and sends the selected authentication information to the authentication proxy sub-module. The authentication proxy sub-module sends the query request to the authentication information management sub-module, according to an access request sent by the other UE connected to the mobile LAN environment, and performs the access authentication of the gateway system to the respective access network and service network by using the received authentication information.

The gateway system further includes a Wide Area Network (WAN) access and management module connected to the communication media access module. The communication media access module sends to the WAN access and management module both the data received from the networks of various media and data to be sent via the networks of various media, and sends data converted and returned by the WAN access and management module to the LAN system and the network of the corresponding media, respectively. The WAN access and management module performs protocol layer conversion on the received data and sends the converted data to the communication media access module. For transmission convenience, all data to be transmitted in the network of various media is encapsulated at the protocol layer, and, therefore, the data received from the network of various media can be identified only after the protocol layer conversion is performed on the data by the WAN access and management module. Further, before data is sent via the network of various media, the WAN access and management module needs to perform the protocol layer conversion on the data so that the data may be transmitted in the network of various media, and sends the data to the network.

Therefore in the embodiment, the gateway system may perform media independent seamless handover of the UEs accessing the mobile LAN environment between networks of various media (for example, the satellite network, the WiMAX network, the 3GPP network, the 3GPP2 network, the WiFi network and the Ethernet). In the embodiments below, for description convenience, the method for implementing media independent seamless handover according to the embodiments of the present invention is described below in detail, by way of taking an example in which the gateway system performs the handover of the UE from the WiFi network to the 3GPP network.

Figure 2:
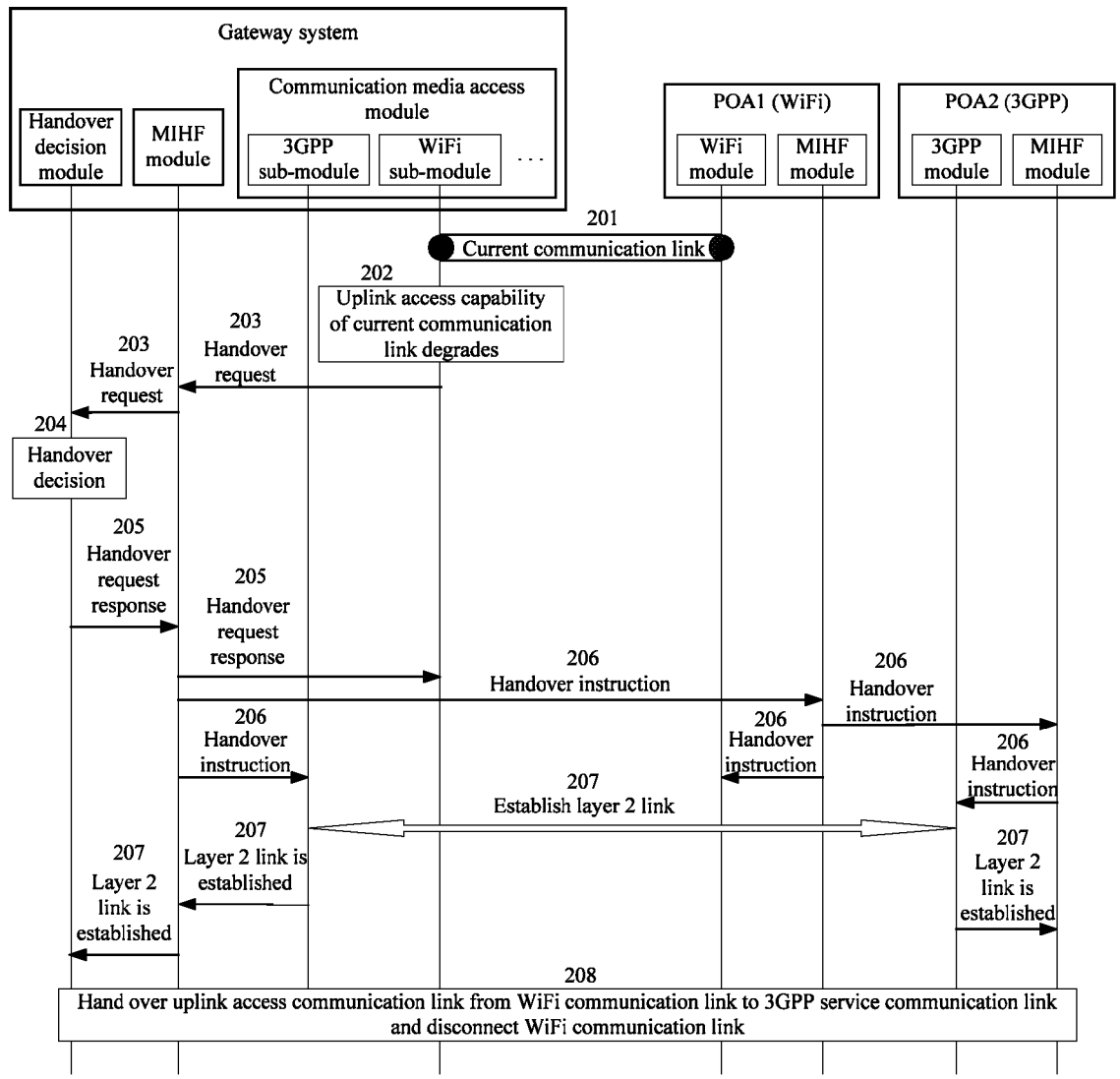
FIG. 2 is a schematic diagram illustrating a media independent seamless handover, according to an embodiment of the present invention.

FIG. 2 is a flow chart illustrating the method for implementing the media independent seamless handover, according to an embodiment of the present invention. The gateway system shown in FIG. 2 is the same as that shown in FIG. 1. However, for description convenience, only a handover decision module, a MIHF module and a communication media access module of the gateway system are shown in FIG. 2, and the other modules of the gateway system are not shown. The communication media access module includes sub-modules of various media, such as a 3GPP sub-module and a WiFi sub-module. Of course, it is possible that the gateway system includes only the handover decision module, the MIHF module and the communication media access module, when only the function of media independent seamless handover between accesses of various media needs to be implemented. In addition, two POAs at the access network side, including POA1 and POA2, are shown in FIG. 2. The POA1 is an AP between the gateway system and the WiFi network, and is equivalent to a base station in the WiFi network. The POA1 includes a WiFi module used for communication between the gateway system and the WiFi network, and a MIHF module used for the media independent handover. The POA2 is an AP between the gateway system and the 3GPP network, and is equivalent to a base station in the 3GPP network. The POA2 includes a 3GPP module used for communication between the gateway system and the 3GPP network, and a MIHF module used for the media independent handover.

As shown in FIG. 2, the method for implementing the media independent seamless handover, according to the embodiment of the present invention, includes the following.

Step 201: A current communication link is provided. When the mobile LAN environment is within the service region of the WiFi network, the WiFi sub-module of the gateway system is connected to the service network subsystem domain (not shown in FIG. 2) via the WiFi module of the POA1 in the WiFi network, with the WiFi wireless access mode being the uplink access approach, so that a WiFi network communication link is provided for the user or the network terminal in the LAN system to access the service network. Therefore, the current communication link is the WiFi network communication link.

Step 202: It is determined whether the current communication link satisfies the service requirements. When the mobile LAN environment is outside of the available service region of the WiFi network, or the uplink access capability between the gateway system and the WiFi network is degraded due to influence of, for example, the external environment, the WiFi sub-module of the gateway system determines whether the uplink access capability of the current WiFi network communication link satisfies the service requirements of the user or network terminal in the LAN system. If the uplink access capability of the current WiFi network communication link satisfies the service requirements, the process returns to Step 201, that is, the WiFi network communication link is retained for the user or network terminal in the LAN system; otherwise, Step 203 is performed.

Step 203: The WiFi sub-module sends a handover request. The WiFi sub-module of the gateway system sends the handover request to the MIHF module of the gateway system, and the MIHF module in turn sends the handover request to the handover decision module of the gateway system that is at the upper layer of the communication protocol. The handover request includes information related to the handover, such as information of service requirements of the user or network terminal in the LAN system, and an address and service capability of the current POA. In the embodiment, the current POA is the POA1 in the WiFi network.

Step 204: The handover decision module selects a target POA for handover. According to the information, such as the address and service capability of the current POA that is carried in the received handover request, the handover decision module obtains information of the POA distribution in the region where the user or the network terminal is currently located from an information server (not shown in FIG. 2) at the access network side, and selects an available POA as the target POA according to information, such as signal strength of the POAs. In the embodiment, for example, the POA2 is selected as the target POA.

Step 205: The handover decision module returns a handover request response. After selecting the target POA for handover, the handover decision module returns a handover request response to the WiFi sub-module sending the handover request via the MIHF module of the gateway system. The handover request response includes information related to the handover, such as the addresses of the current POA and the target POA.

Step 206: The MIHF module of the gateway system sends a handover instruction. As shown in FIG. 2, according to the information, such as the addresses of the current POA and the target POA, that is carried in the received handover request response, the MIHF module of the gateway system sends the handover instruction to the MIHF module of the POA1 and the 3GPP sub-module of the gateway system that is capable of 3GPP network communication. Subsequently, the MIHF module of the POA1 sends the handover instruction to the WiFi module of the POA1 and the MIHF module of the target POA (i.e. POA2), and the MIHF module of the POA2 sends the handover instruction to the 3GPP module of the POA2 that is capable of 3GPP network communication. The handover instruction includes information related to the handover, such as the addresses of the current POA and the target POA.

Step 207: A 3GPP network communication link is established. As shown in FIG. 2, upon receiving the handover instruction, the 3GPP sub-module of the gateway system and the 3GPP module of the POA2 establish a layer 2 communication link between the gateway system and the 3GPP network, i.e. the 3GPP network communication link, according to a link establishment command of the 3GPP network communication protocol. Further, the uplink access communication link is handed over from the original WiFi network communication link to the established 3GPP network communication link, and the original WiFi network communication link is disconnected, so that the entire media independent seamless handover is completed. After the layer 2 communication link is established, the 3GPP sub-module of the gateway system and the 3GPP module of the POA2 notify, via a layer 2 communication link established command of the 3GPP network communication protocol, the MIHF modules of the gateway system and the POA2, respectively, that the layer 2 communication link is established. Subsequently, the MIHF module of the gateway system further notifies the handover decision module of the gateway system that the layer 2 communication link is established.

Step 208: The handover is completed. After the layer 2 communication link between the gateway system and the 3GPP network, i.e. the 3GPP network communication link, is established, the gateway system hands over the uplink access communication link from the original WiFi network communication link to the established 3GPP network communication link, shifts the current communication traffics to the established layer 2 communication link, i.e. the 3GPP network communication link, and disconnects the original WiFi network communication link, so that the media independent seamless handover is completed.

Based on the established 3GPP network communication link, the gateway system performs the protocol conversion on the data packets from the service network with the WAN access and management module and sends the converted data packets to the user or network terminal within the LAN system in the mobile LAN environment. The user or network terminal within the LAN system accesses the service network via the gateway system and the established 3GPP network communication link, to complete the entire media independent seamless handover. During the handover of the gateway system from the WiFi network to the 3GPP network, the media independent seamless handover is implemented and the continuity of the current service is ensured, therefore, the user or network terminal in the LAN system perceives no service network interruption.

With the networking architecture as shown in FIG. 1, the gateway system cannot only implement the media independent seamless handover, but also enable sharing of the authentication information of the UE through the authentication module in the gateway system, so that the other UEs connected to the gateway system or the LAN system may implement the multimedia access and service connection to the service network by using the shared authentication information. The multimedia access and service connection means access and service connection to the service network by means of access approaches of various media. The access includes access authentication or registration. Since the communication with the service network by means of the access approaches of various media has been described above in detail in the above embodiments, the method by which the UE implements the access and service connection to the service network via the gateway system is described below in detail in the embodiments below.

In the embodiment of the present invention, the authentication information sharing method includes the following. First, a UE1 with a UICC/ISIM card (for example a mobile phone) completes the access authentication or registration with a service network N0 (for example the IMS), and stores the authentication information of the UE1 for the service network N0, which includes authentication information and service capability information of the subscribed user. Subsequently, when the UE with the UICC/ISIM card is connected to the LAN system or gateway system and initiates an access request to the gateway system, an authentication information obtaining sub-module of the gateway system queries for the UE initiating the access request in real time and obtains the authentication information stored in the UE; or, after connected to the gateway system or the LAN system, the UE with the UICC/ISIM card reports initiatively the stored authentication information to the gateway system; or the gateway system initiatively queries for the UE with the UICC/ISIM card connected to the gateway system or LAN system to obtain the authentication information stored in the UE. After obtaining the authentication information, the gateway system stores the obtained authentication information in the authentication information management sub-module and updates the authentication information in real time, so that the authentication information may be used by the authentication information management sub-module during the service capability query and decision, and used by the other UE2 (for example a mobile PC) connected to the gateway system to perform access authentication or registration with the respective network, so that the authentication information is shared.

According to the above authentication information sharing method, with the networking structure as shown in FIG. 1, the access from the UE to the service network may be authenticated with the following two methods.

Figure 3:
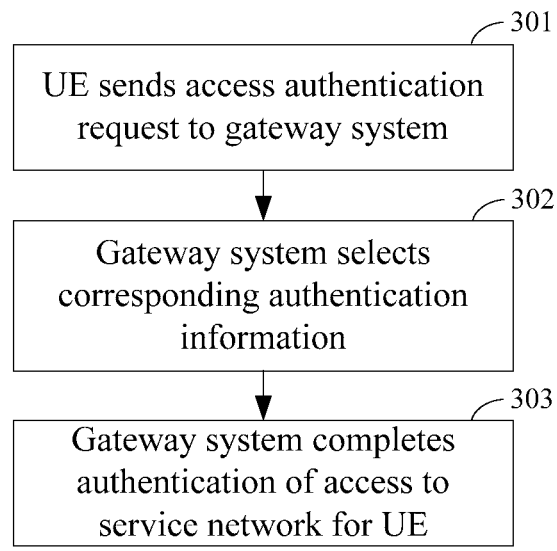
FIG. 3 is a flow chart illustrating the method for authenticating the access from the User Equipment to the service network, according to an embodiment of the present invention.

FIG. 3 is a flow chart illustrating the method for authenticating the access from the UE to the service network according to an embodiment of the present invention. In the present embodiment, the method for authenticating the access from the UE to the service network includes: when receiving from the UE2 in the mobile LAN environment (for example the mobile PC) a request for authenticating the access from the UE2 to the service network, the gateway system selects the corresponding authentication information, according to the service capability request information in the access authentication request, and authenticates the access from the UE2 to the service network N0 with the authentication information.

As shown in FIG. 3, particularly, the above method for authenticating the access from the UE to the service network includes:

Block 301: The UE sends an access authentication request to the gateway system. The UE2, which needs to access the service network N0, sends to the authentication proxy sub-module of the gateway system a request for authenticating the access to the service network. The access authentication request includes the service capability request information of the UE2.

Block 302: The gateway system selects the corresponding authentication information. The authentication proxy sub-module of the gateway system sends an authentication information query request to the authentication information management sub-module of the gateway system, according to the service capability request information in the received access authentication request. According to the service capability request information in the received authentication information query request, the authentication information management sub-module selects from the stored authentication information the appropriate authentication information of which the service capability satisfies the above service capability request, such as the authentication information of the UE1 for the service network N0. The authentication information includes the authentication information and service capability information of the subscribed user.

Block 303: The gateway system completes the authentication of the access to the service network for the UE.

Particularly, the authentication information management sub-module of the gateway system sends the selected authentication information to the authentication proxy sub-module. According to the authentication information of the subscribed user in the received authentication information, the authentication proxy sub-module sends to the service network N0 an access authentication request carrying the authentication information of the subscribed user and some public information of the UE2, such as an IP address. The service network N0 returns information about unauthorization to the authentication proxy sub-module, according to the authentication information of the subscribed user in the access authentication request. After receiving the information about unauthorization, the authentication proxy sub-module sends the information about unauthorization to the UE2, and establishes a secure communication path conforming to the IP Security Protocol Security Association (IPsec SA) standard from the gateway system to the service network N0. After receiving the information about unauthorization, the UE2 sends again to the authentication proxy sub-module of the gateway system an access authentication request, which includes some private information of the UE2, such as the data to be encrypted or key in addition to the public information of the UE2. According to the access authentication request sent by the UE2, the authentication proxy sub-module sends the access authentication request to the service network N0 via the established secure communication path. The service network N0 returns an authorization response to the authentication proxy sub-module, according the received access authentication request. After receiving the authorization response, the authentication proxy sub-module sends the authentication information to the UE2, to complete the authentication of the access from the UE2 to the service network N0, so that the UE2 may access the service network N0. In the above Block 302, the authentication information management sub-module of the gateway system has stored the authentication information of the UE1 for the service network N0, according to the authentication information sharing method described above. In addition, in the above process, when needing to obtain the authentication information of the UE1 for the service network from the UE1, the gateway system negotiates the usage of the authentication information with the UE1, and obtains the authentication information, only after the usage authorization by the UE1. Further, for operations to be performed in the UICC/ISIM card only, such as data encryption operation, the gateway system may send the data to be processed to the UE1 with the UICC/ISIM card to request the UE1 to process the data, and after processing the data, the UE1 sends the processed data to the gateway system, so that the gateway system may complete the subsequent authentication of the access to the service network.

Figure 4:
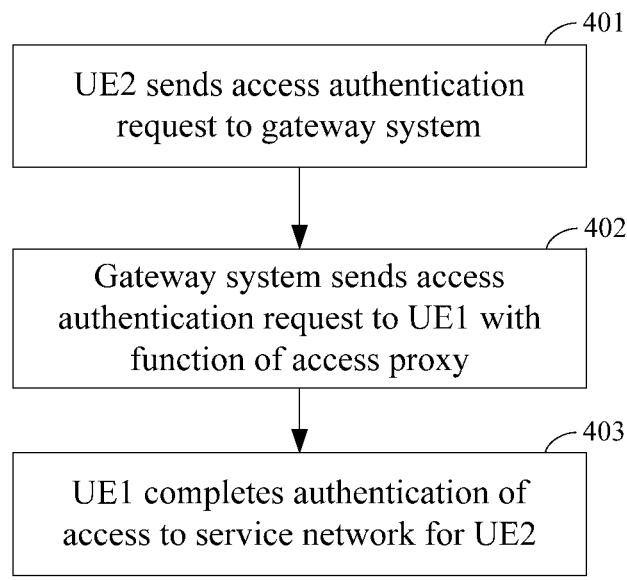
FIG. 4 is a flow chart illustrating the method for authenticating the access from the User Equipment to the service network, according to another embodiment of the present invention.

FIG. 4 is a flow chart illustrating the method for authenticating the access from the UE to the service network, according to another embodiment of the present invention. In the present embodiment, the method for authenticating the access from the UE to the service network includes the following: when receiving a request for accessing the service network sent by a UE2 in the LAN system, the gateway system sends the access request to a UE1, which is connected to the LAN system or the gateway system, which has a UICC/ISIM card and an access proxy function, and the UE1 offers the proxy of the access from the UE2 to the service network, to complete the authentication of the access from the UE2 to the service network.

As shown in FIG. 4, particularly, the above method for authenticating the access from the UE to the service network includes:

Block 401: The UE2 sends an access authentication request to the gateway system. The UE2 (for example a mobile PC) which needs to access the service network N0 sends to the authentication proxy sub-module of the gateway system a request for authenticating the access to the service network. The access authentication request includes the service capability request information of the UE2.

Block 402: The gateway system sends the received access authentication request to the UE1 having the access proxy function. The authentication proxy sub-module of the gateway system sends an authentication information query request to the authentication information management sub-module, according to the service capability request information in the received access authentication request. According to the service capability request information in the authentication information query request, the authentication information management sub-module selects from the stored authentication information the authentication information of the UE, which has a service capability satisfying the above service capability request, supports authentication information sharing, and has the access proxy function, and sends the selected authentication information (including the authentication information of the subscribed user and the service capability information of the subscribed user) to the authentication proxy sub-module. According to the received authentication information, the authentication proxy sub-module sends the access authentication request from the UE2 to a corresponding UE1 (for example a mobile phone), which is connected to the LAN system or gateway system, has the UICC/ISIM card, and has the access proxy function.

Block 403: The UE1 completes the authentication of the access to the service network for the UE2. According to the received access authentication request, the UE1 having the access proxy function offers the proxy of the access to the service network N0 for the UE2 to complete the authentication of the access from the UE2 to the service network N0, so that the UE2 may access the service network N0. The implement of Block 403 is similar to that of Block 303, except that the authentication proxy sub-module of the gateway system at Block 303 is replaced with the UE1.

In the above two methods of authenticating the access from the UE to the service network, the UE1 with the UICC/ISIM card may store the authentication information in the SIM card or the UICC/ISIM card. Alternatively, the UE1 may store the authentication information in the UE1 or an external storage device supported by the UE1 as a data file.

Furthermore, in the above two methods for authenticating the access from the UE to the service network, the communication between the UE or the authentication module and the service network, for example the initiation of an access request to the service network and the authentication of the access to the service network, has to be performed through the communication media access module of the gateway system. However, for the description convenience, the description of the procedure in which the UE or the authentication module communicates with the service network through the communication media access module is omitted in the description of the above two methods. Also, during the communication between the UE or the authentication module and the service network, the communication media access module of the gateway system may ensure the continuity of the current service with the above methods for the media independent seamless handover.

The method for authenticating the access from the UE to the service network is described above. Similarly, the UE may register with the service network subsystem domain through the gateway system.

Figure 5:
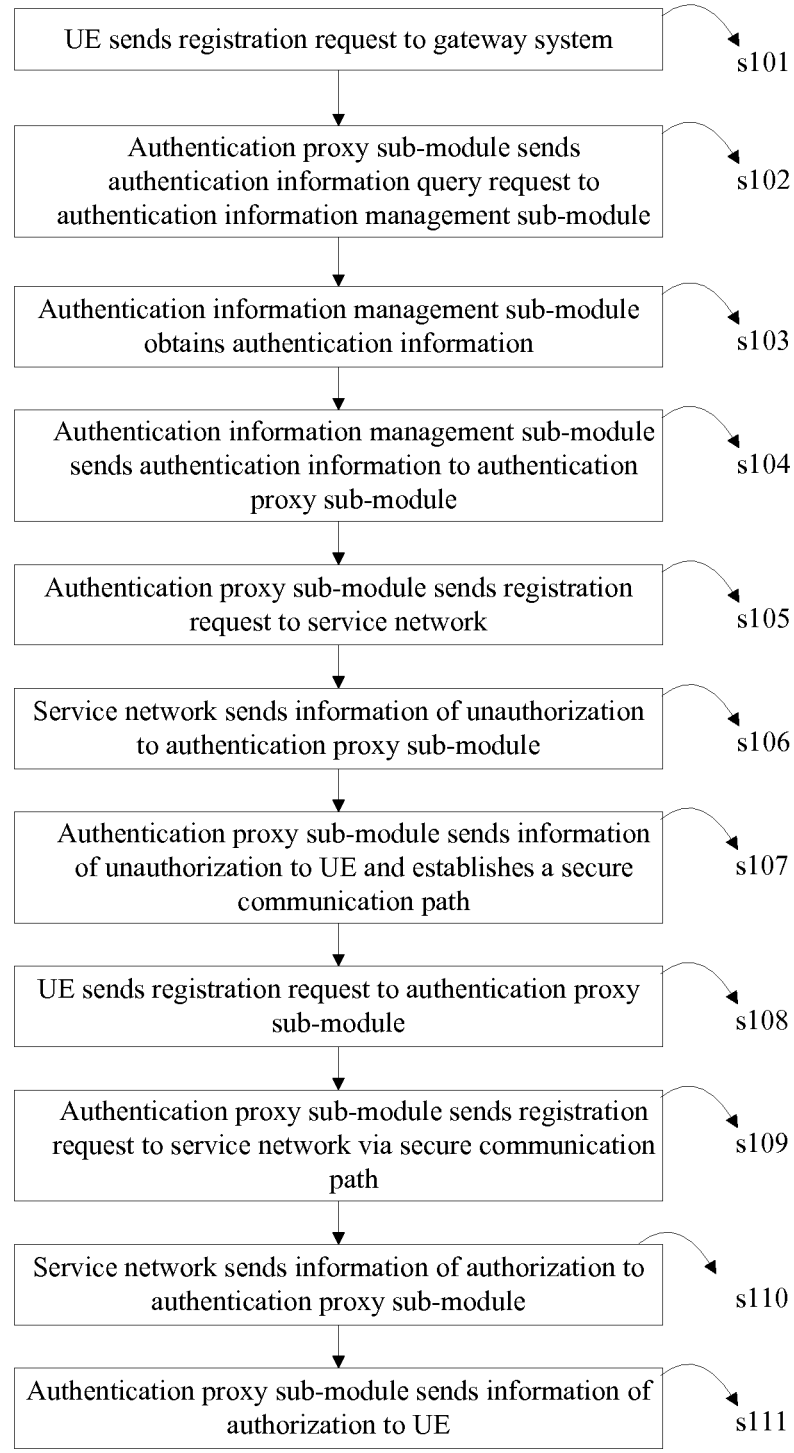
FIG. 5 is a flow chart illustrating the registration of the User Equipment, according to an embodiment of the present invention.

FIG. 5 is a flow chart illustrating the registration of the UE, according to an embodiment of the present invention. As shown in FIG. 5, the registration of the UE, according to the embodiment, includes:

Block s101: The UE sends a registration request to the gateway system. The UE in the mobile LAN environment sends to the gateway system a registration request for connecting to a service network subsystem domain, and the registration request includes service capability request information of the UE.

Block s102: The authentication proxy sub-module sends an authentication information query request to the authentication information management sub-module. Particularly, the authentication proxy sub-module of the gateway system sends the authentication information query request to the authentication information management sub-module, according to the service capability request information in the registration request of the UE.

Block s103: The authentication information management sub-module obtains the authentication information, according to the authentication information query request. Particularly, according to the service capability request information in the authentication information query request, the authentication information management sub-module selects authentication information from the authentication information stored in the gateway system, and obtains the selected authentication information, which includes the authentication information of the subscribed user and the service capability information of the subscribed user.

Block s104: The authentication information management sub-module sends the authentication information to the authentication proxy sub-module. Particularly, the authentication information management sub-module provides the selected authentication information for the authentication proxy sub-module.

Block s105: The authentication proxy sub-module sends a registration request to the service network, according to the information of the subscribed user. Particularly, the authentication proxy sub-module sends the registration request to the service network subsystem domain, according to the authentication information of the subscribed user in the received authentication information.

Block s106: The service network sends information of unauthorization to the authentication proxy sub-module. Particularly, the service network subsystem domain returns the information of unauthorization to the authentication proxy sub-module, according to the registration request.

Block s107: The authentication proxy sub-module sends the information of unauthorization to the UE and establishes a secure communication path. After receiving the information of unauthorization, the authentication proxy sub-module sends the information of unauthorization to the UE, and establishes the secure communication path conforming to the IPsec SA standard from the gateway system to the service network subsystem domain.

Block s108: The UE sends a registration request to the authentication proxy sub-module. After receiving the information of unauthorization, the UE sends again a registration request to the authentication proxy sub-module of the gateway system. The registration request at Block s108 is different from that at Block s101 in that the registration request at Block s101 includes only some public information of the UE, while the registration request at Block s108 includes not only the public information of the UE, but also some private information of the UE, such as the data to be encrypted or key.

Block s109: The authentication proxy sub-module sends the registration request to the service network via the secure communication path. Particularly, the authentication proxy sub-module sends the registration request to the service network subsystem domain via the established secure communication path, according to the registration request sent by the UE.

Block s110: The service network sends the information of authorization to the authentication proxy sub-module. Particularly, the service network subsystem domain returns an authorization response to the authentication proxy sub-module, according to the received registration request.

Block s111: The authentication proxy sub-module sends the information of authorization to the UE. Particularly, the authentication proxy sub-module sends the information of authorization to the UE after receiving the authorization response to complete the registration.

After the access authentication or registration with the service network subsystem domain, the UE may send a service request to the service network subsystem domain via the gateway system to establish a service connection, so that service data is transferred.

In the case of the networking structure as shown in FIG. 1, the UE may send a service request to the service network subsystem domain via the gateway system to implement the multimedia access. The service network subsystem domain may be, for example, the IMS.

Figure 6:
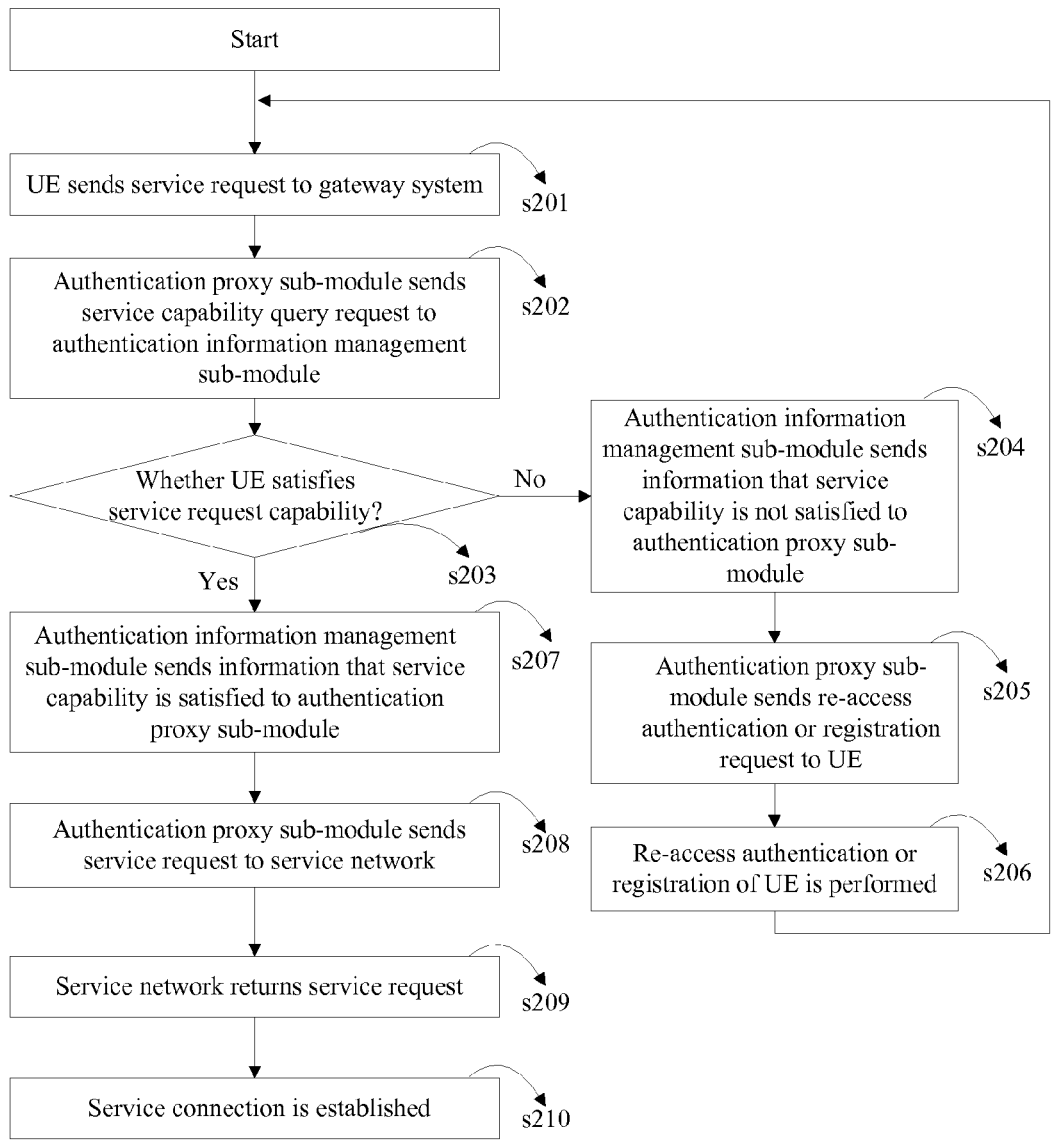
FIG. 6 is a flow chart illustrating that the User Equipment sends a service request, according to an embodiment of the present invention.

FIG. 6 is a flow chart illustrating that the UE establishes a service connection according to an embodiment of the present invention. As shown in FIG. 6, the procedure in which the UE establishes a service connection, according to the embodiment, includes:

Block s201: The UE sends a service request to the gateway system. Particularly, the UE completing the access authentication or registration sends the service request to the authentication proxy sub-module of the gateway system. The service request includes the service capability requirements of the UE.

Block s202: The authentication proxy sub-module sends a service capability query request to the authentication information management sub-module. Particularly, the authentication proxy sub-module sends the service capability query request to the authentication information management sub-module, according to the service capability requirements of the UE from the service request.

Block s203: It is determined whether the UE satisfies the service request capability. According to the service capability query request, the authentication information management sub-module queries for the service capability of the UE completing the access authentication or registration from the stored authentication information, and determines whether the service capability of the UE satisfies the service request. If the service capability of the UE satisfies the service request, the procedure proceeds to Block s207; otherwise, the procedure proceeds to Block s204.

Block s204: The authentication information management sub-module sends to the authentication proxy sub-module the information that the service capability is insufficient. Particularly, the authentication information management sub-module sends to the authentication proxy sub-module the information that the service capability of the UE completing the access authentication or registration does not satisfy the current service request capability.

Block s205: The authentication proxy sub-module sends a re-access authentication request or a re-registration request to the UE. Particularly, the authentication proxy sub-module sends the re-access authentication request or the re-registration request to the UE sending the above service request.

Block s206: The UE performs the access authentication or registration again, and the procedure goes to Step s201. Similar to the methods as shown in FIGS. 3, 4, and 5, the UE performs the access authentication or registration again through the authentication proxy sub-module and the authentication information management sub-module, and the procedure proceeds to Block s201 after the access authentication or registration.

Block s207: The authentication information management sub-module sends to the authentication proxy sub-module the information that the service capability is sufficient. Particularly, the authentication information management sub-module sends to the authentication proxy sub-module the information that the service capability of the user completing the access authentication or registration satisfies the current service request capability.

Block s208: The authentication proxy sub-module sends the service request to the service network. Particularly, the authentication proxy sub-module sends the service request to the service network subsystem domain.

Block s209: The service network returns the service request. Particularly, the service network returns the service request to the authentication proxy sub-module, which, in turn, returns the service request to the UE.

Block s210: A service connection is established. The UE establishes the service connection to the service network via the authentication proxy sub-module, to implement the service data transfer.

Similarly, in the procedure of the UE registration and that of the service connection establishment of the UE, the communication between the UE or the authentication module and the service network, for example, the initiation of a registration request or a service request to the service network, has to be performed through the communication media access module of the gateway system. However, for the description convenience, the description of the procedure in which the UE or the authentication module communicates with the service network through the communication media access module is omitted in the description of the above two procedures. Also, during the communication between the UE or the authentication module and the service network, the communication media access module of the gateway system may ensure the continuity of the current service with the above methods for implementing the media independent seamless handover.

The foregoing description is merely illustrative of the preferred embodiments of the invention, and is not intended to limit the scope of the invention. All modifications, equivalents and variations made within the principle of the invention are intended to be within the scope of the invention.

What is claimed is:

1. A gateway system for implementing access to various media, comprising a processing device configured to:
provide a communication link from the gateway system to a first network of a plurality of networks;
generate a handover request according to status of the communication link from the gateway system to the first network of the plurality of networks;
select a second network of the plurality of networks according to the handover request;
generate information of the second network related to a handover from the first network to the second network; and
establish a communication link from the gateway system to the second network according to the information of the second network;
receive an access request from a second User Equipment, wherein the processing device is further configured to perform one of:
(i) obtain and store first authentication information for accessing the second network from at least one User Equipment other than the second User Equipment that supports sharing of the authentication information, select second authentication information satisfying access requirements of the second User Equipment different from the at least one User Equipment from the stored first authentication information, according to the access request from the second User Equipment, and implement access from the second User Equipment to the second network, according to the selected second authentication information;
or,
(ii) forward the access request received from the second User Equipment to a first User Equipment of the at least one User Equipment that supports sharing of authentication information, wherein the first User Equipment includes the second authentication information for accessing the second network and has the ability of enabling access to the second network from the second User Equipment via the first User Equipment.

2. The gateway system of claim 1, wherein the processing device is further configured to:
disconnect the communication link from the gateway system to the first network after the connection of the second User Equipment is handed over to the communication link from the gateway system to the second network.

3. The gateway system of claim 1, wherein the generating the handover request according to the status of the communication link to the first network comprises:
generating a handover request, by the gateway system, when uplink access capability of the communication link from the gateway system to the first network fails to satisfy access requirements of the second User Equipment.

4. The gateway system of claim 1, wherein the information of the second network includes an address of the second network.

5. A method for implementing access to various media, comprising:
generating a handover request according to status of a communication link from a gateway system to a first network of a plurality of networks; and
selecting a second network of the plurality of networks according to the received handover request;
generating information of the second network related to a handover from the first network to the second network;
establishing a new communication link from the gateway system to the second network according to the information of the second network; and
receiving an access request from a second User Equipment, wherein the method further includes:
obtaining and storing, by a gateway system, first authentication information used for accessing the second network, wherein the first authentication information is received from at least one User Equipment other than the second User Equipment that supports sharing of the first authentication information;
querying for and selecting second authentication information satisfying access requirements of the second User Equipment different from the at least one User Equipment from the stored first authentication information, according to the access request received from the second User Equipment; and
performing one of:
(i) implementing, by the gateway system, access from the second User Equipment to the second network via a communication media access module, according to the selected second authentication information;
or,
(ii) forwarding, by the gateway system, the access request received from the second User Equipment to a first User Equipment of the at least one User Equipment that supports sharing of authentication information that corresponds to the selected second authentication information, and wherein the access from the second User Equipment to the second network is implemented via the first User Equipment.

6. The method of claim 5, wherein the method further comprises:
receiving, by the gateway system, a second access request sent by the second User Equipment;
selecting, by the gateway system, the second authentication information from the first authentication information in the gateway system, according to access requirement information in the received second access request, and sending a first access request to the second network, according to the second authentication information; and
implementing, by the gateway system, the access from the second User Equipment to the second network.

7. The method of claim 6, wherein implementing, by the gateway system, the access from the second User Equipment to the second network further comprises:
forwarding to the second User Equipment, by the gateway system, information of unauthorization which is returned by the second network in response to the received access request, and establishing a secure communication path to the second network, according to the received information of unauthorization;
forwarding, by the gateway system, a re-access request returned by the second User Equipment to the gateway system in response to the information about unauthorization to the second network via the secure communication path; and
forwarding to the second User Equipment, by the gateway system, information about authorization returned by the second network to the gateway system in response to the re-access request, to complete the access from the second User Equipment to the second network.

8. The method of claim 5, wherein the method further comprises:
receiving, by the gateway system, a second access request sent by the second User Equipment;
selecting, by the gateway system, the second authentication information from the first authentication information in the gateway system according to access requirement information in the received second access request, and forwarding the second access request to a first User Equipment that supports sharing of the authentication information and corresponds to the second authentication information, and the first User Equipment sends a first access request to the second network via the gateway system by using the second authentication information stored in the first User Equipment according to the received second access request; and
implementing, by the gateway system, the access from the second User Equipment to the second network through the first User Equipment.

9. The method of claim 8, wherein implementing, by the gateway system, the access from the second User Equipment to the second network through the first User Equipment further comprises:
forwarding to the first User Equipment, by the gateway system, information of unauthorization which is returned by the second network in response to the received first access request;
forwarding, by the first User Equipment, the received information of unauthorization to the second User Equipment, and establishing a secure communication path to the second network, according to the received information of unauthorization;
sending, by the second User Equipment, a re-access request to the first User Equipment, according to the received information of unauthorization;
forwarding, by the first User Equipment, the received re-access request to the second network via the secure communication path;
sending, by the second network, information of authorization to the first User Equipment, according the received re-access request; and
forwarding, by the first User Equipment, the received information of authorization to the second User Equipment, to complete the access from the second User Equipment to the second network.

10. The method of claim 5, further comprising:
verifying, by the gateway system, access request capability of the second User Equipment, according to the received access request sent by the second User Equipment; and
forwarding, by the gateway system, the access request to the second network, and establishing a connection between the second User Equipment and the second network.

11. The method of claim 10, wherein verifying, by the gateway system, the access request capability of the second User Equipment, according to the received access request sent by the second User Equipment, further comprises:
determining, by the gateway system, whether the second User Equipment satisfies the access request capability, according the received access request; and if the second User Equipment satisfies the access request capability, the method further comprises: forwarding, by the gateway system, the access request to the second network, and establishing a connection between the second User Equipment and the second network; otherwise, the method proceeds to: sending, by the gateway system, the re-access request to the second User Equipment; and
completing, by the second User Equipment, the re-access, according to the received re-access request, and subsequently sending an access request to the gateway system, and the method further comprises: verifying, by the gateway system, the access request capability of the second User Equipment, according to the received access request sent by the second User Equipment.

12. The method of claim 10, wherein forwarding, by the gateway system, the access request to the second network and establishing a connection between the second User Equipment and the second network comprises:
forwarding, by the gateway system, the access request of the second User Equipment to the second network;
returning, by the second network, an access request response to the second User Equipment via the gateway system, according to the received access request; and
establishing, by the second User Equipment, a connection to the second network via the gateway system, according to the received access request response.

13. The method of claim 5, further comprising:
disconnecting the communication link from the gateway system to the first network after the connection of the User Equipment is handed over to the new communication link.

14. The method of claim 5, wherein generating a handover request according to status of a communication link from the gateway system to the first network comprises:
generating a handover request, by the gateway system, when uplink access capability of the communication link from the gateway system to the first network fails to satisfy access requirements of the User Equipment.

15. The method of claim 5, wherein the information of the second network includes an address of the second network.

* * * * *